Sept. 5, 1950  G. M. WALLER  2,521,138
CLUTCH PLATE
Filed Jan. 11, 1946  2 Sheets-Sheet 1

INVENTOR.
GUSTAV M. WALLER
BY
Clarence F. Poole
Atty

Sept. 5, 1950 G. M. WALLER 2,521,138
CLUTCH PLATE
Filed Jan. 11, 1946 2 Sheets-Sheet 2
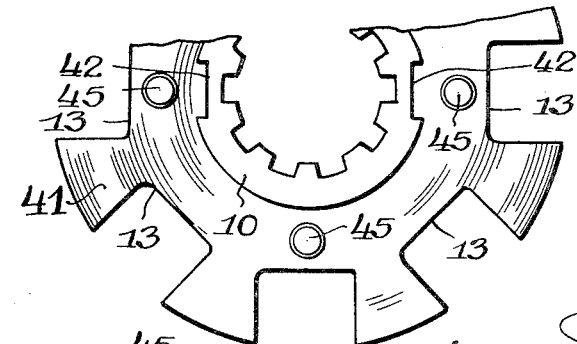
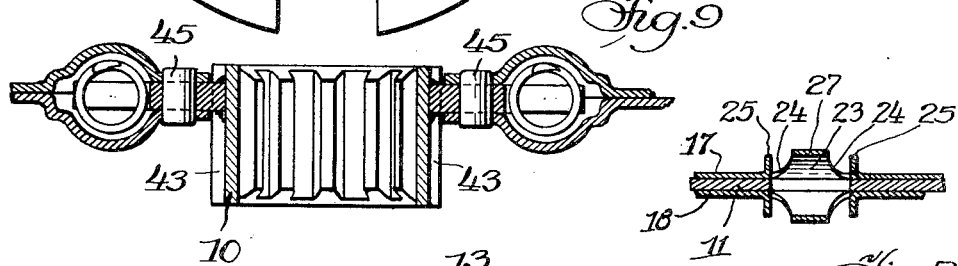
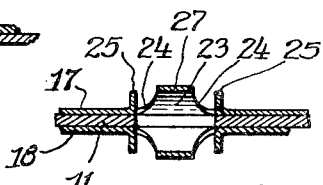
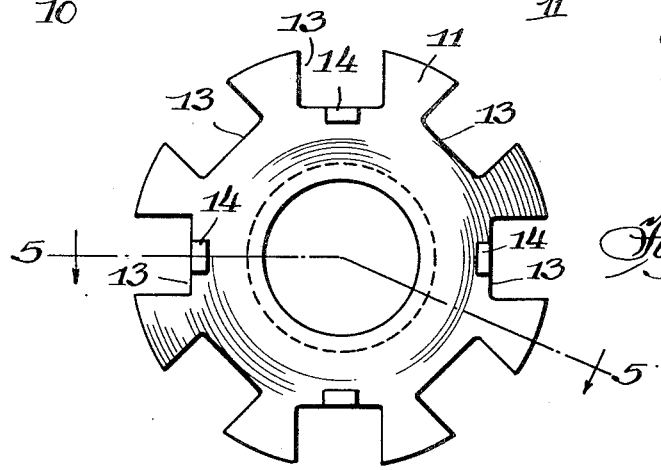
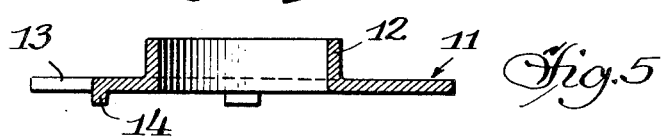
INVENTOR.
GUSTAV M. WALLER
BY
Clarence F. Poole
Atty Patented Sept. 5, 1950

2,521,138

UNITED STATES PATENT OFFICE 2,521,138

CLUTCH PLATE

Gustav M. Waller, Dundee, Ill., assignor to Burgess-Norton Manufacturing Company, Geneva, Ill., a corporation of Illinois Application January 11, 1946, Serial No. 640,443

1 Claim. (Cl. 64—27)

This invention relates to improvements in clutch plates of the spring center type wherein the outer portion of the plate carrying the clutch facings has limited rotation with respect to the inner portion or hub against yielding resistance offered by springs.

Among the objects of the present invention is to provide an improved clutch plate of the character above described which is simple, durable and inexpensive to manufacture.

A further object of the invention is to provide a simplified and improved stop means for limiting the rotation of the friction member relative to the hub.

Another object is to provide an improved construction and arrangement of the friction disc member made up of two complementary metal plates having a plurality of segments on their outer peripheries crimped in opposite directions, to provide an improved yieldable mounting for the clutch facings of the clutch plate.

A still further object of the invention is to provide an improved form and arrangement of spring housings between opposed surfaces of the plates.

The invention may best be understood by reference to the accompanying drawings, in which Figure 1 is a face view of the improved plate.

Figure 4 is a detailed view of the flange member forming part of the hub.

Figure 5 is a section taken on line 5—5 of Figure 4.

Figure 6 is a detailed section taken on line 6—6 of Figure 1 showing a view of one of the complementary metal plates which support the clutch facings.

Figure 7 is a detailed section taken longitudinally through one of the spring pockets in the plate but with the spring removed therefrom.

Figure 8 is a fragmentary face view of a modified form of hub member including a flange having a plurality of stop pins mounted therein instead of out-turned integral stop lugs as in the form shown in Figures 4 and 5.

Figure 9 is a section of the modified form of hub member shown in Figure 8.

Figure 1:
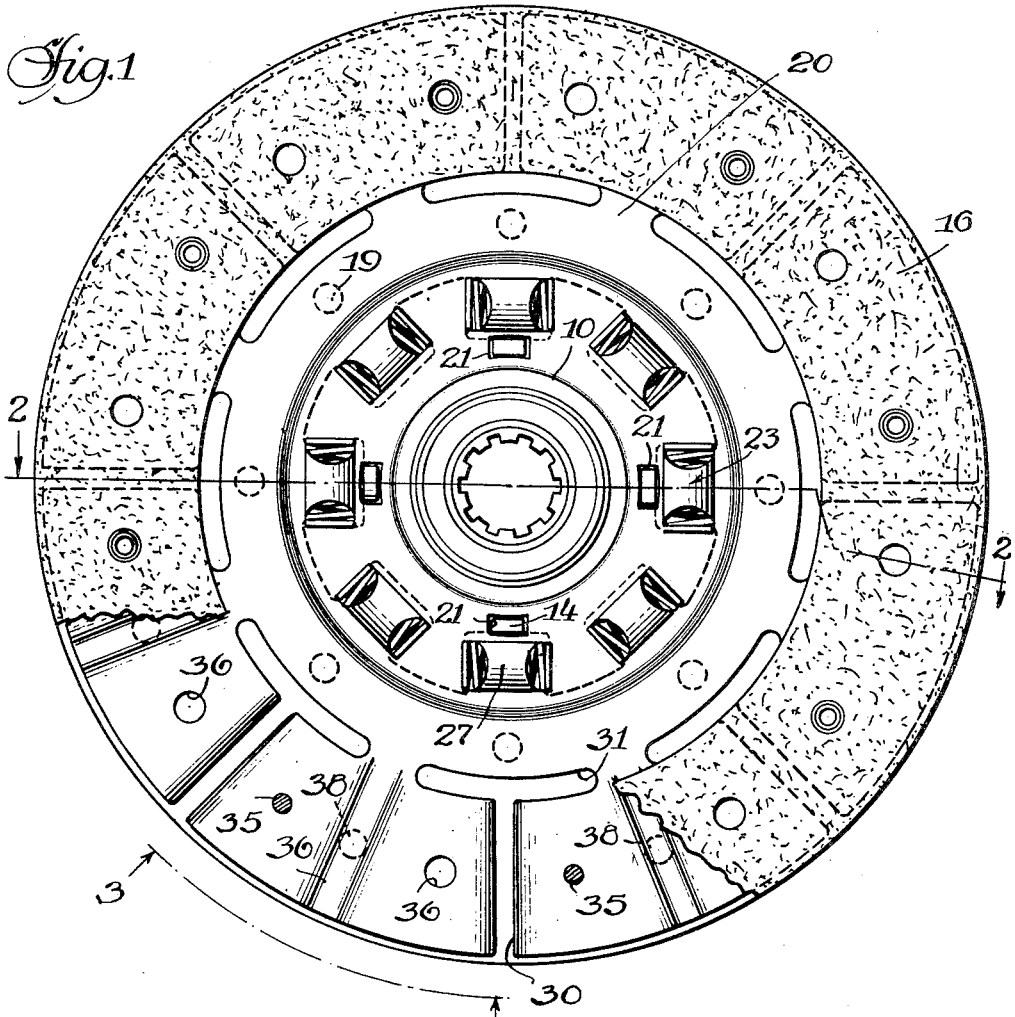

Referring now to details of the embodiment of my invention shown in the drawings, the clutch plate includes a hub member 10 having a radially extending flange member 11, preferably formed of a separate piece of metal. In the form shown in Figures 1, 2, 4 and 5 the flange member 11 is made of a stamping having an axially extending annular flange 12 which is secured to the outer periphery of the hub member 10 as by brazing or welding.

The radial portion of the hub flange 11 is provided with a plurality of circumferentially spaced slots 13, 13 and is also provided with outwardly turned stop lugs 14, 14 located along the inner margins of certain of the spring slots 13. In the form shown herein there are eight circumferentially spaced spring slots 13 and four stop lugs 14 are provided, as shown in Figure 4.

An annular friction member indicated generally at 15 has a plurality of clutch facing members 16, 16 mounted on opposite sides thereof, around its periphery. Said friction member 15 consists of two complementary metal plates 17 and 18 of relatively thin metal which are mounted on the hub at opposite sides of the flange member 11. Said plates 17 and 18 are spaced apart to permit said flange member 11 to extend in close fitting engagement therebetween, but beyond the outer periphery of the flange member 11 said plates 17 and 18 are brought into face to face engagement with each other and are secured together by suitable means such as by spot welding at a plurality of points 19,19, to form a substantially rigid annular friction plate area indicated at 20 surrounding the outer periphery of the flange member 11.

Figure 2:
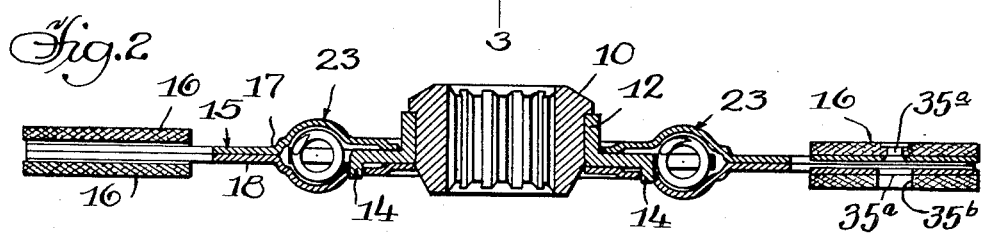
Figure 2 is a section taken on line 2—2 of Figure 1.
Figure 3:
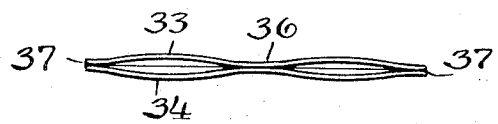
Figure 3 is a fragmentary detailed view showing a portion of the friction disc plates viewed from the outer edge thereof, but with the facing material removed from opposite sides of the plates.

As will be seen in Figures 1 and 2 the stop lugs 14 on the flange 11 project through apertures 21, 21 formed in the adjacent plate 18, said stop lugs 14 fitting loosely in said apertures so as to permit limited rotational movement of the plates 17 and 18 relative to the flange 11 and the hub upon which the latter is mounted. Each of the plates 17 and 18 are provided with complementary spring pockets 23 which are circumferentially spaced so as to register with the spring pockets 13 in the flange member 11. In the improved form of spring pocket shown in detail in Figure 7, the plates 17 and 18 are each cut along substantially semi-circular lines 24, 24 at each end of the spring pocket, and the resulting tabs 25, 25 immediately adjacent opposite ends of each pocket are bent outwardly at right angles to its respective plate so as to form abutments for the end of the spring 26 when the latter is mounted in the spring pocket 23. The portion of the plate between each pair of end tabs 25, 25 are pressed or drawn outwardly into substantially semi-cylindrical form to provide a continuous arched central portion 27 projecting over each of the spring pockets.

As will be observed in Figure 1, the central arched portions 27 of the spring pockets 23 adjacent the apertures 21 through which the stop lugs 14 project, provide a substantial reinforcement for the portions of the plates 17 and 18 in the vicinity of the apertures 21, and particularly provide a bridging connection to the areas of the plates 17 and 18 beyond each spring pocket 23.

Referring now to the construction and arrangement of the outer periphery of the plates 17 and 18, on which the clutch facings are mounted, said plates are provided with a plurality of mutually registering slots 30 extending radially inwardly to the annular plate area 20, connected to circumferentially extending slots 31 to form T-shaped openings which define a plurality of similar peripherally spaced plate segments indicated at 32, 32. Each of said plate segments has a pair of relatively free circumferentially extending wing portions 33 and 34.

In the form shown herein, the areas of the plates 17 and 18 which form the peripheral segments 32, 32 are crimped or arched slightly in mutually opposed relation to each other, both of said plates having similar hill and dale contours circumferentially thereof. They are in engagement with each other along a central radially extending dale area of each segment indicated at 36 and also along the dale areas at opposite lateral edges of each wing as indicated at 37, 37, but are separated from each other in the hill areas along opposite sides of the intermediate area 36.

In the preferred form shown, the plates are preferably secured together along their central dale areas 36 of each segment, as by spot welding at one or more points 38, while the lateral edges of said plates are adapted to engage each other along marginal dale areas 37 to permit free sliding movement relative to each other when under yielding tension. This arrangement affords a yielding mounting for the clutch facings 16, 16 in either direction, since the opposed plates 17 and 18 are in mutually supporting relation to each other.

The clutch facings 16, 16 are each secured to the peripheries of plates 17, 18 by riveting them to the arched or hill areas of the proximate plate, independently of the opposite plate. In the form shown, the plates 17 and 18 each have a series of circumferentially spaced rivet holes 35 and larger apertures 35a alternately disposed in the hill areas thereof, as shown in Figure 1. The plates are arranged with respect to each other so that the rivet hole 35 in one plate registers with a larger aperture 35a in the opposite plate, as seen in Figure 2. The clutch facings are also provided with large apertures 35b adapted to register with the large apertures 35a in the adjacent plate.

This arrangement provides clearance for the inner heads of the rivets 35c when the opposed hill areas of plates 17 and 18 are compressed together under load on the clutch facings. It also provides means for access of an abutment tool through one of the plates when applying the rivets to the opposite plate.

In the modified form of flange member shown in Figures 8 and 9 a separate flange plate 41 is provided with circumferentially spaced spring slots 13, 13 as in the case with the flange plate 11 but in the modified form the flange plate has no axially extending flange where it connects with the hub member 10. Instead the flange plate 41 has a central aperture provided with opposed projections 42, 42 which are fitted in slots 43, 43 on the periphery of the hub member 10. Said flange member is suitably secured to the hub as by welding.

The modified form of flange plate 41 also differs from the flange plate 11 of Figure 4 by having a plurality of cylindrical studs 45, 45 extending therethrough and projecting from opposite faces thereof to form stop lugs corresponding with the stop lugs 14, 14 on plate 11.

Although I have shown certain embodiments of my invention, it will be understood that I do not wish to be limited to the exact construction shown and described, but that various changes and modifications may be made without departing from the spirit and scope of the invention as defined in the appended claim.

I claim:

In a spring center clutch plate, a hub member having a generally flat, radial flange, the edge of said flange being formed with outwardly open, circumferentially spaced, generally rectangular spring notches, the hub member having, along some of the said notches, intermediate their ends, offset stop lugs, integral with the flange, bent in like direction from one face of the flange, two generally similar, unitary, substantially flat centrally apertured plates having inner circumferential edge portions mounted on opposite sides of the hub flange, outer portions of said plates being oppositely offset to form, together, circumferentially arranged, generally cylindrical spring pockets registering with the spring notches in the edge of the radial flange, one of said plates having apertures radially inwardly spaced from said spring pockets and positioned to receive the stop lugs for limited rotary movement of the plates relative to said flange, and coil springs seated in said spring slots and pockets, the plates being in circumferential engagement radially outwardly of said pockets, the engaging portions of said plates being secured to each other, and forming a continuous, circumferential reinforcement radially outwardly spaced from the spring pockets.

GUSTAV M. WALLER.

REFERENCES CITED

The following references are of record in the file of this patent:

UNITED STATES PATENTS

| Number | Name | Date |
| --- | --- | --- |
| 1,652,007 | Gamble | Dec. 6, 1927 |
| 1,837,173 | Reed | Dec. 15, 1931 |
| 1,858,312 | Spase | May 17, 1932 |
| 2,076,373 | Katcher | Apr. 6, 1937 |
| 2,158,244 | Mistretta et al. | May 16, 1939 |
| 2,284,278 | Goodwin | May 26, 1942 |
| 2,294,638 | Tower | Sept. 1, 1942 |
| 2,316,820 | Thelander | Apr. 20, 1943 |

FOREIGN PATENTS

| Number | Country | Date |
| --- | --- | --- |
| 837,852 | France | Feb. 22, 1939 |